United States Patent
Kleppen

(10) Patent No.: US 9,958,087 B1
(45) Date of Patent: May 1, 2018

(54) OIL TANK VALVE DART THAT HOLDS OIL TANK VALVE CLOSED AND THAT FURTHER HOLDS SEAL TO BE DESTROYED TO REMOVE DART

(71) Applicant: New Way Solutions, LLC, Watford City, ND (US)

(72) Inventor: Gregory D. Kleppen, Watford City, ND (US)

(73) Assignee: New Way Solutions, LLC, Watford City, ND (US)

( * ) Notice: Subject to any disclaimer, the term of this patent is extended or adjusted under 35 U.S.C. 154(b) by 221 days.

(21) Appl. No.: 14/852,541

(22) Filed: Sep. 12, 2015

Related U.S. Application Data

(60) Provisional application No. 62/211,620, filed on Aug. 28, 2015.

(51) Int. Cl.
    *F16K 35/06* (2006.01)
    *F16K 35/04* (2006.01)
    *F16K 35/10* (2006.01)

(52) U.S. Cl.
    CPC .............. *F16K 35/04* (2013.01); *F16K 35/06* (2013.01); *F16K 35/10* (2013.01)

(58) Field of Classification Search
    CPC ... Y10T 137/7256; F16K 35/04; F16K 35/10; F16K 35/06
    USPC ............... 220/323, 324, 725, 833–835, 375; 137/385; 70/175–177
See application file for complete search history.

(56) References Cited

U.S. PATENT DOCUMENTS

| | | | |
|---|---|---|---|
| 1,445,068 A | | 2/1923 | Brown |
| 1,890,744 A | * | 12/1932 | Noonan ................. F16K 35/10 70/180 |
| 2,789,344 A | | 4/1957 | Kaul |
| D195,948 S | | 8/1963 | Rosentreter |
| 3,399,560 A | | 9/1968 | Connolly |
| 3,579,859 A | | 5/1971 | Malenge |
| 3,714,802 A | * | 2/1973 | Morse et al. ......... E05B 67/365 70/34 |
| D232,086 S | | 7/1974 | Graham |
| D232,626 S | | 9/1974 | Smallwood |
| 3,865,130 A | * | 2/1975 | Mullis ..................... F16K 35/10 137/385 |
| 3,898,699 A | | 8/1975 | Zientara |
| RE31,027 E | * | 9/1982 | Di Giovanni ........... F16K 35/06 137/384 |

(Continued)

OTHER PUBLICATIONS

Dart with screw sold by Greg Willis of G and C Machine Shop of Watford City, North Dakota, in the United States in the year 2013.

(Continued)

*Primary Examiner* — James N Smalley

(57) ABSTRACT

An oil valve dart apparatus having a body for being inserted through two portions of an oil tank valve to prevent the two portions of the oil tank valve from moving relative to each other to thereby prevent fluid flow. A stop prevents the dart apparatus from being withdrawn one way. A seal held in a through slot near the other end of the dart apparatus prevents the dart apparatus from being withdrawn the other way. A cap is engaged to and spaced from the stop by a shaft. A tether is engaged to the shaft and a safety pin is engaged to the tether. The body, stop, cap and shaft are co-axial, integral and one-piece.

22 Claims, 3 Drawing Sheets

(56) References Cited

U.S. PATENT DOCUMENTS

| | | | |
|---|---|---|---|
| D268,512 S | 4/1983 | Lien | |
| D291,824 S | 9/1987 | Lathrop | |
| 4,926,900 A | 5/1990 | Pietras | |
| 4,971,289 A * | 11/1990 | Pietras | F16K 35/06 137/385 |
| 5,004,114 A * | 4/1991 | Terbrusch | B65D 41/04 206/459.5 |
| 5,499,427 A | 3/1996 | Bowman | |
| 6,325,165 B1 | 12/2001 | Eyre | |
| 6,687,957 B2 | 2/2004 | Worrell | |
| 7,219,685 B1 | 5/2007 | Espinoza | |
| D696,068 S | 12/2013 | Baacke | |
| 2002/0078721 A1 | 6/2002 | Vellette et al. | |
| 2011/0095040 A1* | 4/2011 | Onken, Jr. | B65F 1/10 220/819 |

OTHER PUBLICATIONS

Hollow dart sold by Balon Corporation of Oklahoma City, Oklahoma, in the United States in the year 2013.
Cylinder Shape, Apr. 7, 2016. Retrieved from http://www.google.com.

* cited by examiner

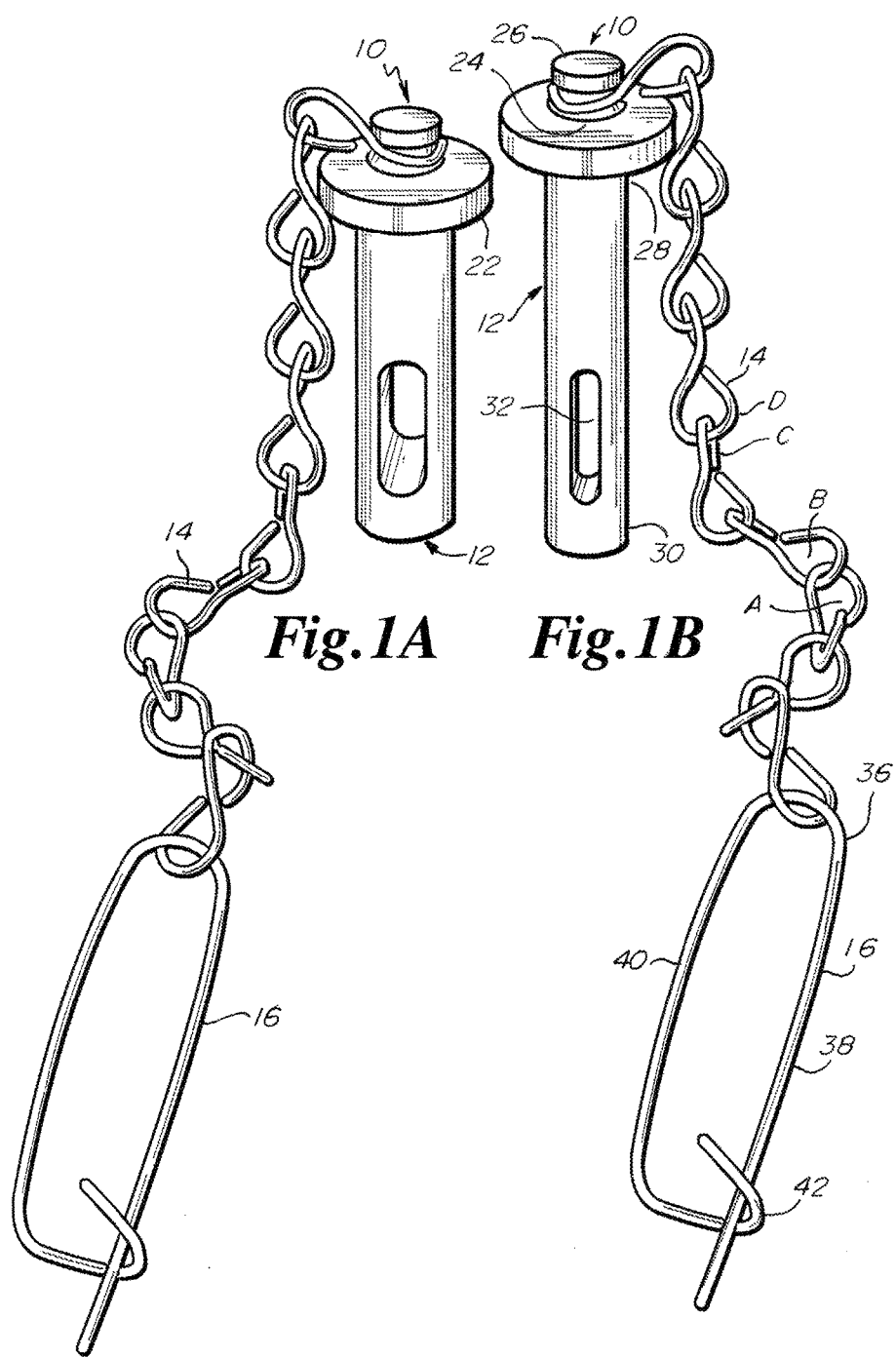
*Fig.1A*  *Fig.1B*

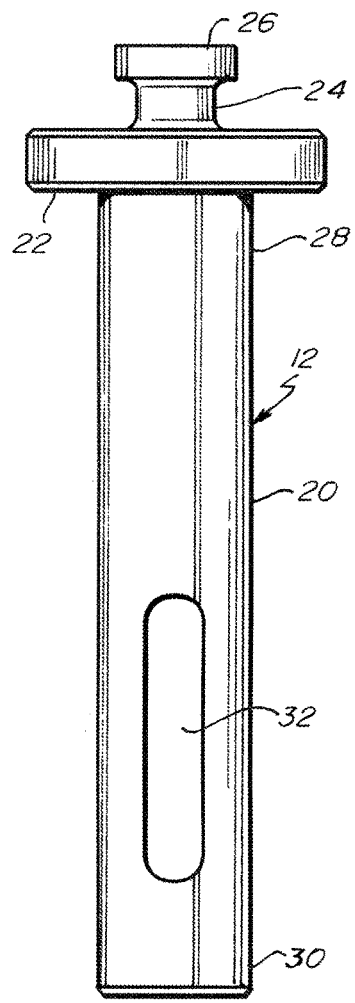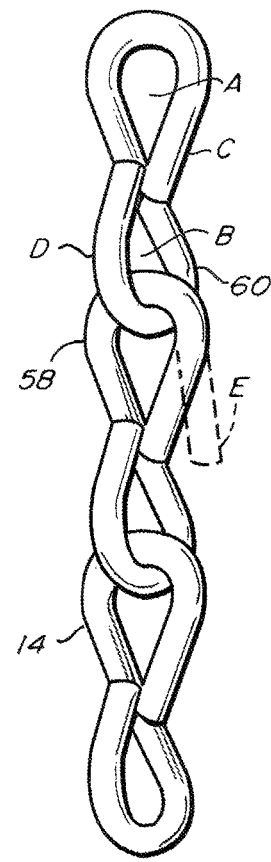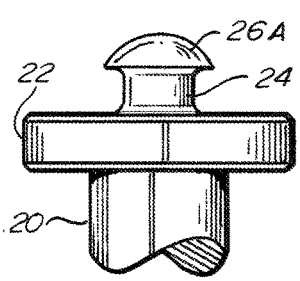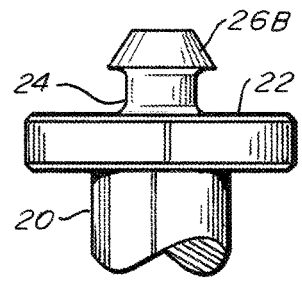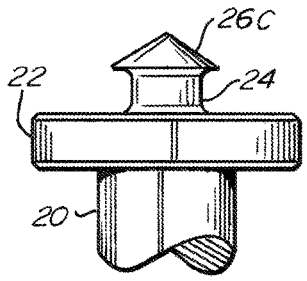
Fig. 2A    Fig. 2B
Fig. 2C    Fig. 2D    Fig. 2E

OIL TANK VALVE DART THAT HOLDS OIL TANK VALVE CLOSED AND THAT FURTHER HOLDS SEAL TO BE DESTROYED TO REMOVE DART This application claims the benefit under 35 U.S.C. 119(e) of U.S. Provisional Patent Application No. 62/211,620 filed Aug. 28, 2015, which provisional application is hereby incorporated by reference in its entirety into this application.

FIELD OF THE INVENTION

The present invention generally relates to a dart for preventing an oil tank valve from being opened and specifically to an oil tank valve dart that is secured on the oil tank valve with a seal such that the seal cannot be removed without compromising the integrity of either the seal or the oil tank valve dart.

BACKGROUND OF THE INVENTION

An oil company may be required to keep records for the federal or state government. One type of record is a seal record report. From time to time, such as on a random basis, the government authority, whether the federal government or state government, will audit an oil company and request the seal record reports. Federal or state auditors will want to see that the seals are numbered correctly and that the seals correctly correspond to oil tank numbers and loads that were hauled out. Seal records tell a story.

A seal is usually a metal strip having two ends. One end is a locking end. The other end is a free end that is inserted into the locking end, whereupon the metal strip takes a loop form. The free end is inserted through an oil tank valve or through an opening in an oil valve dart, and then the free end is inserted into the locking end and the two ends are locked together. The only way to remove the seal from the oil tank valve or the oil tank valve dart is to destroy the structural integrity of the seal or the oil tank valve dart such as by cutting the seal.

An oil tank valve that is sealed with only a seal, but without a seal dart through an oil tank valve is not considered a legal seal by either the federal or state government.

To remove the seal, a trucker will either cut the seal with a tool such as a tinsnips or stick the handle of a relatively large steel wrench (about 16 inches long used to open the oil tank valve) through the loop of the seal. The trucker will work the handle back and forth or pry down on the seal to break the seal by force or bend and break the dart. Or a trucker may open the oil tank valve with the dart still locked on the oil tank valve, thereby at best bending the dart and at worst breaking the dart into two or more pieces. In either case, the bent or broken dart needs to be replaced. Some darts are hollow and are easily bent or broken.

A dart is inserted through the aligned openings of an oil tank valve. Then the free end of a new seal is inserted through a slot in the new dart and then the seal is formed or bent into a half circle such that the free end is drawn adjacent to the other end of the new seal that engages a lock. The exposed, flat, free end of the new seal is inserted into this lock that covers the other end of the new seal. Once the seal is inserted into the lock, a spring or other sort of locking mechanism permanently engages the free end of the seal such that the free end of the seal cannot be removed from the locking end without compromising the structural integrity of the seal such as by cutting or breaking the seal. The locking mechanisms are such that they cannot be tampered with. If tampered with, there is clear physical evidence on the seal and/or lock that the seal was compromised. The types of locking mechanisms used are such that, even if disassembled and reassembled, the locking mechanism will show evidence of such reassembly.

SUMMARY OF THE INVENTION

A feature of the present invention is an oil tank valve dart apparatus for being inserted through two portions of an oil tank valve to prevent the two portions of the oil tank valve from moving relative to each other and to thereby prevent fluid flow through the oil tank valve.

Another feature of the present invention is the provision in such an oil tank valve dart apparatus, of the oil tank valve dart apparatus, after insertion through the two portions of the oil tank valve, being engaged to a seal that prevents withdrawal of the oil tank valve dart apparatus out of the oil tank valve unless the seal is destroyed and the seal is removed from the oil tank valve apparatus.

Another feature of the present invention is the provision in such an oil tank valve dart apparatus, of a body for being inserted through the two portions of the oil tank valve to prevent the two portions of the oil tank valve from moving relative to each other to thereby prevent fluid flow, the body having a first width, the body having a proximal end and a distal end.

Another feature of the present invention is the provision in such an oil tank valve dart apparatus, of a stop on the body, the stop being on the proximal end of the body, the stop having a second width, the second width of the stop being greater than the first width of the body such that the stop stops an insertion of the body into the oil tank valve at a predefined location.

Another feature of the present invention is the provision in such an oil tank valve dart apparatus, of a through opening in the body between the proximal and distal ends of the body for receiving the seal.

Another feature of the present invention is the provision in such an oil tank valve dart apparatus, of a cap, the cap engaged to and spaced from the stop, the cap and body being disposed on opposite sides of the stop.

Another feature of the present invention is the provision in such an oil tank valve dart apparatus, of the body, stop and cap being integral and one-piece.

Another feature of the present invention is the provision in such an oil tank valve dart apparatus, of the cap including a third width, the third width of the cap being less than the first width of the stop.

Another feature of the present invention is the provision in such an oil tank valve dart apparatus, of the cap including a third width, the third width of the cap being less than the second width of the body.

Another feature of the present invention is the provision in such an oil tank valve dart apparatus, of a shaft between the cap and the stop, the shaft, cap, stop and base being integral and one-piece.

Another feature of the present invention is the provision in such an oil tank valve dart apparatus, of the cap having a disk shape.

Another feature of the present invention is the provision in such an oil tank valve dart apparatus, of the cap having a dome shape.

Another feature of the present invention is the provision in such an oil tank valve dart apparatus, of the cap having a conical shape.

Another feature of the present invention is the provision in such an oil tank valve dart apparatus, of the cap having a frustoconical shape.

Another feature of the present invention is the provision in such an oil tank valve dart apparatus, of an oil tank valve dart apparatus in combination with the seal, the seal including a strip having a loop form and a strip form, the strip having a width, the through opening having a length extending in a longitudinal direction, the length of the through opening being less than twice the width of the strip to minimize longitudinal movement of the strip in the through opening while in the loop form and to maintain ease of insertion of the strip through said through opening when the strip is in the strip form.

Another feature of the present invention is the provision in such an oil tank valve dart apparatus, of the oil tank valve dart apparatus in combination with the seal, where the seal includes one of a width and length at least as great as the stop such that the seal prevents the body from sliding a first way out of the oil valve and such that the stop prevents the body from sliding a second way out of the oil valve, the seal having a structural integrity, the seal being nonslideable out of the through opening when the structural integrity of the seal is intact.

Another feature of the present invention is the provision in such an oil tank valve dart apparatus, of the oil tank valve dart apparatus of in combination with the seal, where the seal includes one of a width and length at least as great as the stop such that the seal prevents the body from sliding a first way out of the oil tank valve and such that the stop prevents the body from sliding a second way out of the oil tank valve, the seal including a loop form, the seal being slideable out of said through opening when the loop form is transformed into a strip form.

Another feature of the present invention is the provision in such an oil tank valve dart apparatus, of a tether where the tether is engaged between the cap and stop.

Another feature of the present invention is the provision in such an oil tank valve dart apparatus, of a a tether where the tether is engaged to the shaft.

Another feature of the present invention is the provision in such an oil tank valve dart apparatus, of the cap, stop and body being coaxial with each other.

Another feature of the present invention is the provision in such an oil tank valve dart apparatus, of an oil tank valve dart apparatus in combination with a tether and safety pin, the tether having a proximal end and a distal end, the proximal end of the tether being engaged between the cap and stop, the distal end of the tether being engaged to the safety pin.

Another feature of the present invention is the provision in such an oil tank valve dart apparatus, of a body for being inserted through the two portions of the oil tank valve to prevent the two portions of the oil tank valve from moving relative to each other to thereby prevent fluid flow, the body having a first width, the body having a proximal end and a distal end, of a stop on the body, the stop being on the proximal end of the body, the stop having a second width, the second width of the stop being greater than the first width of the body such that the stop stops an insertion of the body into the oil valve at a predefined location, of a through opening in the body between the proximal and distal ends of the body for receiving the seal, of a cap, the cap engaged to and spaced from the stop, the cap and body being disposed on opposite sides of the stop, of the cap having a third width, the third width of the cap being less than the first width of the stop, and of a shaft between the cap and the stop.

Another feature of the present invention is a method for attaching a tether having tether openings to an oil tank valve dart apparatus, the oil valve dart apparatus being insertable through two portions of an oil tank valve that move relative to each other to permit oil flow and for holding a seal, the oil tank valve dart apparatus including a) a body for being inserted through the two portions of the oil valve to prevent the two portions of the oil valve from moving relative to each other to thereby prevent fluid flow, the body having a first width, the body having a proximal end and a distal end, b) a stop on the body, the stop being on the proximal end of the body, the stop having a second width, the second width of the stop being greater than the first width of the body such that the stop stops an insertion of the body into the oil tank valve at a predefined location, c) a through opening in the body between the proximal and distal ends of the body for receiving the seal, d) a cap, the cap engaged to and spaced from the stop, the cap and body being disposed on opposite sides of the stop, e) a shaft between the cap and stop and engaged to each of the cap and stop, and f) the body, stop, cap and shaft being integral and one-piece, the method including the steps of a) selecting a tether opening in the tether, b) placing the tether opening over the cap and about the shaft, and c) narrowing the tether opening to a width less than a width of the cap.

Another feature of the present invention is the provision in a method of attaching a tether having tether openings to an oil tank valve dart apparatus, of the step of widening the tether opening in the tether, the step of widening the tether opening taking place between the steps of selecting a tether opening and placing the tether opening over the cap.

Another feature of the present invention is the provision in a method of attaching a tether having tether openings to an oil tank valve dart apparatus, of the step of selecting a chain as the tether, the chain comprising a set of links, one of the links of the chain including the tether opening.

Another feature of the present invention is the provision in a method of attaching a tether having tether openings to an oil tank valve dart apparatus, of the step of making a plurality of dart chains from a base chain without cutting the base chain.

Another feature of the present invention is the provision in a method of attaching a tether having tether openings to an oil tank valve dart apparatus, of the step of making a plurality of dart chains from a base chain by selecting a base chain having a FIG. 8 link with two distinct ends.

Another feature of the present invention is the provision in a method of attaching a tether having tether openings to an oil tank valve dart apparatus, of the step of making a plurality of dart chains from a base chain by widening a half link of a base chain to generate an opening in the half link.

An advantage of the present invention is that the dart of the oil tank valve dart apparatus is one-piece and integral. The oil tank valve dart apparatus includes a dart, a seal, a chain, and a safety pin. The dart itself includes the cap, shaft, stop and body in a structural order from top to bottom. The proximal end of the chain engages the shaft between the cap and stop. The distal end of the chain engages the safety pin. The seal engages a slot in the body of the dart. By making the cap, shaft, stop and body as a one-piece and integral unit, the apparatus as a whole has one less piece, i.e., a screw that screws the chain to the top of the stop. By making the cap, shaft, stop and body as a one-piece and integral unit, the dart is stronger because no hole has to be drilled in the stop and down into the body for receiving a screw to engage the chain. By making the cap, shaft, stop and body as a one-piece and integral unit, the dart is stronger because the cap and shaft is one-piece and integral with the stop and body—there is no screw to be stripped out of its hole. By making the cap, shaft, stop and body as a one-piece and integral unit, manufacturing costs are minimized because no hole is drilled into the stop and body and because no screw needs to be screwed into the hole.

It is of prime importance that the dart be strong from top to bottom or from end to end. Truck drivers pry seals off with wrenches and bend darts out of shape. Damaged darts must be replaced. Truck drivers open oil tank valves with darts still in place in the oil tank valve, thereby twisting the dart into two or more pieces. Broken darts must be replaced. My dart is strong because it is machined from one solid piece of steel.

BRIEF DESCRIPTION OF THE DRAWINGS

FIG. 1A is a perspective view of the present oil tank valve dart apparatus, where such oil tank valve dart apparatus has a dart that is relatively short and that includes an opening for a seal that is relatively wide.

FIG. 1B is a perspective view of the present oil tank valve dart apparatus, where such oil tank valve dart apparatus has a dart that is relatively long and that includes an opening for a seal that is relatively narrow.

FIG. 2A is an elevation view of the dart of the oil tank valve dart apparatus of FIG. 1B.

FIG. 2B is a detail elevation view of the type of chain linkage employed for the chain of the oil tank valve dart apparatus of FIGS. 1A and 1B.

FIG. 2C is a first alternate embodiment of the oil tank valve dart apparatus for either of FIG. 1A or 1B.

FIG. 2D is a second alternate embodiment of the oil tank valve dart apparatus for either of FIG. 1A or 1B.

FIG. 2E is a third alternate embodiment of the oil tank valve dart apparatus for either FIG. 1A or 1B.

DETAILED DESCRIPTION

Figure 3:
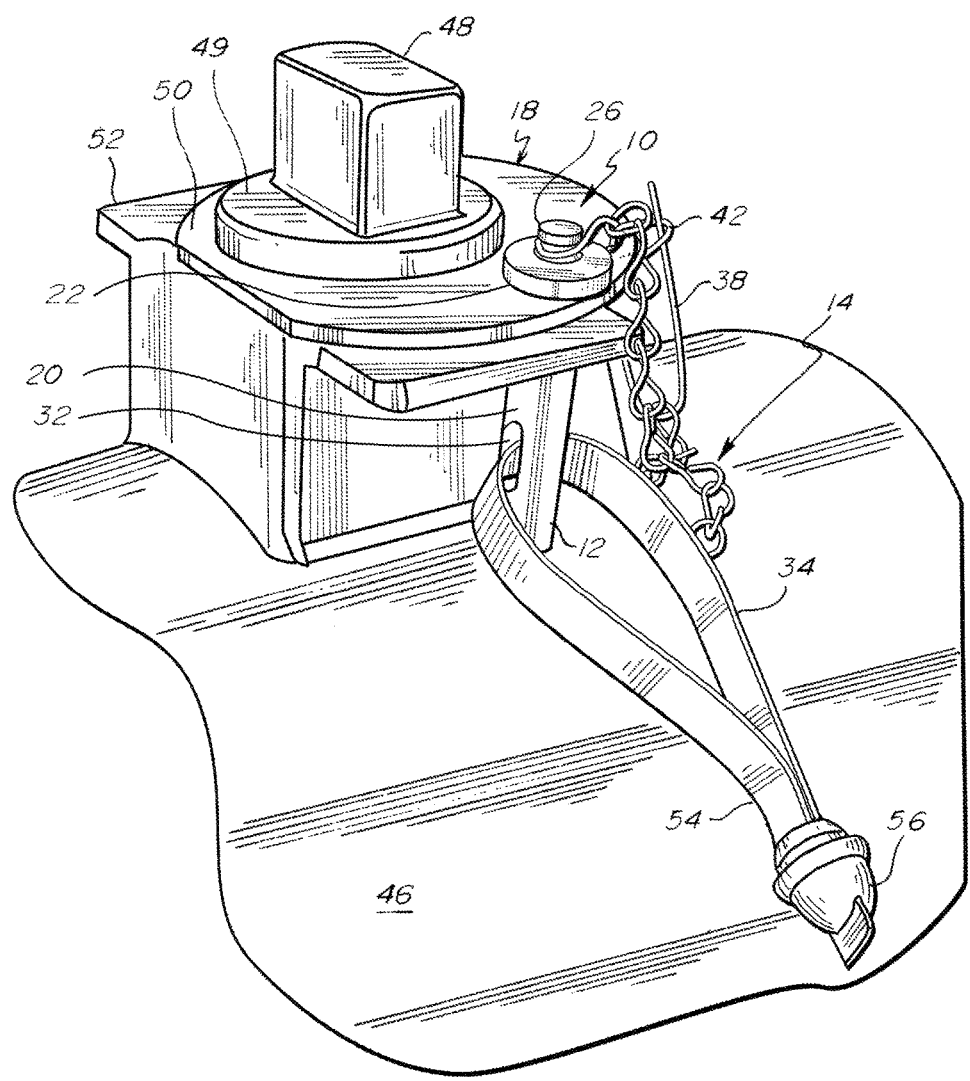
FIG. 3 is a perspective view of the oil tank valve dart apparatus of FIG. 1B engaging an oil tank valve.

As shown in FIGS. 1A and 1B, the present oil tank valve dart apparatus is indicated in general by reference number 10. Each of FIGS. 1A and 1B shows dart apparatus 10. The dart apparatus 10 in FIG. 1A is identical to the dart apparatus 10 in FIG. 1B except for the size of the dart 12. The dart 12 of FIG. 1B has a length greater than the length of the dart 12 of FIG. 1A. The dart 12 of FIG. 1A has a slot for a seal that is wider than the seal slot of the dart 12 of FIG. 1B.

Dart apparatus 10 includes a dart 12, a chain or tether 14 and a safety pin 16. Dart apparatus 10 is engaged to an oil tank valve 18 (shown in FIG. 3) that controls oil or fluid flow from a storage tank to a tank truck or tanker truck or semi-trailer truck.

As shown in FIGS. 1A, 1B and 2A, dart 12 includes a body 20, stop 22, shaft 24 and cap or top 26. Body 20, stop 22, shaft 24 and cap 26 are integral and one-piece. Dart 12, including body 20, stop 22, shaft 24 and cap 26 are machined from one solid piece of steel. Body 20, stop 22, shaft 24 and cap 26 are co-axial.

Body 20 is cylindrical. Body 20 includes a proximal end 28 and a distal end 30. Distal end 30 includes an absolute end flat surface that extends at a right angle to the cylindrical sidewall of the body 20. Dart 12 can stand upside down by itself on the distal end 30 such that the dart 12 is self-standing.

An elongated slot 32 extends diametrically through the body 20 at a location between the proximal and distal ends 28, 30. A distal end of slot 32 is disposed at a first distance from distal end 30 of body 20. A proximal end of slot 32 is disposed at a second distance from proximal end 28 of body 20. The first distance is less than the second distance such that a midpoint of the slot 32 is closer to the distal end 30 than the proximal end 28. The distal end of slot 32 confronts and is adjacent to the distal end 30 of the body 20. The elongated slot 32 includes curved proximal and distal inner ends. The elongated slot 32 includes flat inner intermediate walls disposed between the curved proximal and distal inner ends. The elongated slot 32 receives a seal 34 (shown in FIG. 3). The elongated slot 32 preferably is entirely exposed to view when the dart 12 is engaged in oil tank valve 18 such that no portion of the elongated slot 32 is covered by a portion of the oil tank valve 18. One way to accomplish this aim of permitting exposure of the entire elongated slot 32 is to minimize the length (or height) of the elongated slot 32 to a point where the length of slot 32 is less than twice the width of seal 34. Another way to accomplish this aim of permitting exposure of the entire elongated slot 32 is to place the elongated slot 32 confrontingly close to the distal end 30 without compromising the strength of the dart 12.

Stop 22 is integral and one-piece with the body 20. Stop 22 is shaped in the form of a disk. Stop 22 is cylindrical. Stop 22 includes an annular flat bottom surface and an annular flat upper surface, which bottom and upper surfaces define respective planes that lie parallel to each other. The flat bottom and upper surfaces are disposed at a right angle to an axis of dart 12. Cap 26 and shaft 24 is disposed on one side of the stop 22 and body 20 is disposed on the other side of the stop 22. Shaft 24 and body 20 oppose each other and stop 22 is intermediate of the shaft 24 and body 20. Stop 22 has a greater width and greater diameter than body 20. Stop 22 has a greater width and greater diameter than shaft 24. Stop 22 has a greater width and greater diameter than cap 26. Each of cap 26 and stop 22 define planes and such planes run parallel to each other.

When the dart 12 is inserted into the oil tank valve 18, the stop 22 stops such an insertion. When stop 22 stops such an insertion, the elongated slot 32 is fully exposed to view on the other side of the oil tank valve 18.

Shaft 24 is integral and one-piece with stop 22 and cap 26. Shaft 24 is disposed between the stop 22 and the cap 26 and supports the cap 26 relative to the stop 22. Shaft 24 includes an intermediate portion that is cylindrical. Between the distal end of the intermediate portion and the stop 22, the shaft 24 tapers downwardly and outwardly to the upper surface of the stop 22. This lower taper is curved. This lower taper extends for 360 degrees about the shaft 24 and is co-axial with the axis of the dart 12. This lower taper may be described as a chamfer or rounding and provides additional strength to the shaft 24 and to the dart 12 as a whole. Between the proximal end of the intermediate portion and the cap 26, the shaft 24 tapers upwardly and outwardly to the cap 26. This upper taper is curved. This upper taper extends for 360 degrees about the shaft 24 and is co-axial with the axis of the dart 12. This upper taper may be described as a chamfer or rounding and provides additional strength to the shaft 24 and dart 12 as a whole. Shaft 24 at all axial locations includes a width and diameter less than a width and diameter of cap 26, less than a width and diameter of stop 22, and less than a width and diameter of body 20. Chain 14 engages shaft 24 in a loosely pivoting manner. Play is present in the pivoting connection between a chain link and shaft 24.

Cap 26 is integral and one-piece with shaft 24. Cap 26 is engaged to the top of shaft 24. Cap 26 is formed in the shape of a disk. Cap 26 is cylindrical. An upper surface of cap 26 is flat and smooth. However, the upper surface of cap 26 may be formed in the shape of a) a dome shape 26A (FIG. 2C), b) a partial sphere 26 (also FIG. 2C) such that the upper surface is spherical, c) a hemisphere such that the upper surface is spherical, d) a cone shape 26C (FIG. 2E) such that the upper surface is conical, or e) a frustoconical shape 26B (FIG. 2D) such that the upper surface is conical.

At its greatest width or greatest diameter, cap 26 has a width or diameter that is greater than a width or diameter of shaft 24, that is less than a width or diameter of stop 22, and that is less than a width or diameter of body 20.

Cap 26 retains the chain 14 on the dart 12. Cap 26 has an undersurface with a width or diameter greater than the inside width or diameter of a link of chain 14. Stop 22 also retains the chain 14 on the dart 12 by having an upper surface with a width or diameter greater than the inside width or diameter of a link of chain 14.

Cap 26 confronts and is adjacent to stop 22. Cap 26 is spaced from stop 22. The undersurface of cap 22 confronts, is adjacent to, and spaced from the proximal or upper surface of stop 22.

Chain 14 includes a proximal end and a distal end. The proximal end of chain 14 is pivotally engaged to the dart 12. The distal end of chain 14 is pivotally engaged to safety pin 16. Each of the links of the chain 14 swings relative to each of its adjacent links such that chain 14 is a flexible tether or flexible chain 14. Each of the links includes a first opening A and a second opening B. Each of the openings is formed by a wire open loop such that each of the links of the chain 14 includes two wire open loops or half links C, D. The two wire open loops C, D of one link lie at right angles relative to each other. Each of the wire open loops C, D of one link are disposed in its own plane, which plane is set at a right angle relative to the plane of the other wire open loop. Each of the open loops or half links C, D of each of the links of chain 14 may be widened under pressure, such as by inserting a conical or tapering tool therein, and then stay fixed in such widened state. A wire open loop E that has been widened (shown in phantom in FIG. 2B) may be pinched back to a state having a width or diameter less than the widened state or pinched back to its original width or diameter or pinched back to a width or diameter less than the original width or diameter, with the step of pinching being carried out by a needle nose pliers. Chain 14 is a single jack chain.

Oil tank valve dart apparatus 10 further includes the safety pin 16. The safety pin 16 is formed from one-piece of a relatively rigid wire. One end of the safety pin 16 includes a first U-shaped portion 36. Chain 14 and dart 12 hang from this first U-shaped portion 36 when the dart 12 is not engaged to the oil tank valve 18. This first U-shaped portion 36 lies in a first plane defined by elongate wire portions 38, 40 of the safety pin 16. Safety pin 16 includes a second U-shaped portion 42. This second U-shaped portion 42 lies in a second plane that is transverse to the first plane of the elongate wire portions 38, 40. This second U-shaped portion 42 extends from elongate wire portion 40. This second U-shaped portion 42 captures elongate wire portion 38 which can be resiliently engaged and disengaged to and from the second U-shaped portion 42.

Oil tank valve 18 is disposed in piping 46 that extends between an oil storage tank and a tanker truck. Oil tank valve 18 controls the flow of oil in the piping 46 from the oil storage tank and the tanker truck. Oil tank valve 18 includes a stem 48 that controls a ball (or other structure) inside the piping 46 to in turn permit fluid flow or stop fluid flow. Stem 48 is turned by a trucker with a relatively large wrench. Stem 48 includes a block portion and a stem disk portion 49 that are one-piece with each other.

An upper disk shaped plate 50 is fixedly engaged to the underside of the disk portion 49 of stem 48. When stem 48 and its stem disk portion 49 are turned, upper disk shaped plate 50 turns.

Upper disk shaped plate 50 confronts a rectangular lower plate 52. Rectangular lower plate 52 is fixedly engaged to piping 46.

Upper disk shaped plate 50 includes a first through opening and rectangular lower plate 52 includes a second through opening. The first and second through openings are aligned with each other when the oil tank valve 18 is in a closed position such that oil does not flow from the oil storage tank to the tanker truck. In such aligned position, the body 20 of dart 12 is insertable through the first and second through openings until the stop 22 of dart 12 hits the upper surface of the upper plate 50. When the lower annular surface of the stop 22 makes contact with the upper surface of the upper plate 50, the elongated slot 32 has entirely passed through the upper and lower plates 50, 52 such that the elongated slot 32 is entirely visible. The first and second through openings of the first and second plates 50, 52 have a width or diameter greater than the body 20. The first opening of the upper plate 50 has a width or diameter less than the width or diameter of stop 22. The second opening of the lower plate 52 may have a width or diameter greater than or less than the stop 22.

Upper plate 50 includes a safety pin opening for elongate portion 40 of safety pin 16. This safety pin opening is offset from the lower rectangular plate 52 such that there is no need for a safety pin opening in lower rectangular plate 52. Safety pin opening of the upper plate 50 is relatively close to the first opening of upper plate 50 that receives the dart 12. The second U-shaped portion 42 of safety pin 16 rests upon the upper plate 50. The resiliency of elongate portion 38 keeps the safety pin 16 closed. Further, the circumferential edge of the upper disk shaped plate 50 closes off the second U-shaped portion 42 to contribute to keep the elongate portion 38 in the second U-shaped portion 42.

Seal 34 is a thin strip of bendable or flexible metal that includes a free end 54 and a lock end 56. Free end 54 is inserted through elongate slot 32 of dart 12 and is then inserted into the lock end 56. Once inserted into the lock end 56, free end 54 cannot be removed without destroying the integrity of the seal 34. A trucker removes seal 34 from the dart 12 by either cutting the seal 34 or inserting the handle end of the wrench (used to turn stem 48) into the loop formed by the locked seal 34 to rip the seal 34 or destroy the lock end 56 such that the seal 34 can be removed from the dart 12. Seal 34 is formed from a metal that can be stamped with indicia, such as with time and date and oil tank number, oil company, and other information.

In operation, to engage the oil tank valve dart apparatus 10 to an oil tank valve 18, the stem 48 is turned to close the oil tank valve 18. In this closed position, the first and second openings of the upper and lower plates 50, 52 are aligned with each other, thereby permitting the dart body 20 to be inserted into such first and second openings until the stop 22 stops on the upper plate 50. Then the free end 54 of the seal 34 is inserted into elongate slot 32 and then into the locked end 56, whereupon the seal 34 is locked to the dart 12 and whereupon the dart 12 is locked to the oil tank valve 18 and whereupon the oil tank valve 18 is locked in the closed position, unable to dispense oil from the oil storage tank to the tanker truck or from the tanker truck to the oil storage tank. Then the safety pin 16 is engaged to the upper plate 50.

In operation, to disengage the oil tank valve dart apparatus 10 from the oil tank valve 18, the seal 34 is cut and removed from the elongate slot 32. The dart 12 is then removed from the first and second plates 50, 52 and then permitted to dangle from the chain 14 on the side of the piping 46. Then the stem 48 is turned ninety degrees in a direction such that the safety pin 16 is drawn away from the lateral side of the lower rectangular plate 52. Upon reaching the ninety degree position, the oil tank valve 18 is fully open and oil may be pumped between the oil storage tank and tanker truck.

In between such operations of engaging and disengaging the oil tank valve dart apparatus 10 to and from the oil tank valve 18, dart 12 cannot be removed from the oil tank valve 18 without destroying either the integrity of the dart 12 or seal 34. For example, if an attempt is made to withdraw the dart 12 vertically from the plates 50, 52, the metal seal 34 will work as a stop on the underside of the lower plate 52.

In operation, a method of making a plurality of dart chains 14 includes the following steps:

a) presenting a base chain from which a first dart chain, a second dart chain and further dart chains will be generated, with the base chain having links, with each of the links having a pair of half links;

b) measuring a length of chain from the proximal half link of the base chain to a distal half link that is located a predefined distance from the proximal half link, with this step of measuring defining the first dart chain;

c) widening the distal half link (such as distal half link 58 shown in FIG. 2B) of the first dart chain such that the first dart chain may be removed from a remaining portion of the base chain and such that the widened distal half link of the first dart chain may be placed over the top 26 and onto the shaft 24 of a first dart 12;

d) measuring a length of chain from the proximal half link (such as proximal half link 60 shown in FIG. 2B) of the remaining portion of the base chain to a distal half link that is located the predefined distance from the proximal half link of the remaining portion of the base chain, with this step of measuring defining the second dart chain;

e) widening the distal half link of the second dart chain such that the second dart chain may be removed from a remaining portion of the base chain and such that distal half link of the second dart chain may be placed over the top 26 and onto the shaft 24 of a second dart 12; and d) continuing with the steps of measuring and widening to generate third, fourth and further dart chains.

It should be noted that the above method of making a plurality of dart chains 14 wastes no links of the chain and wastes no half links of the chain. It should be noted that this method selects a chain that includes half links that are pinched closed and that includes a distinct end (such that one link includes two distinct ends). In other words, the half links or open loops of the base chain are not 360 degrees integral. In still other words, each half link or open loop is not endless. Each wire open loop is closed in the sense of being pinch closed, not closed in an integral sense. Each half link or open loop includes one distinct end. Each link includes two distinct ends. Each link is made out of one piece of wire or rod that forms a FIG. 8, where each of the half links defines a plane and where such planes lies at 90 degrees relative to each other.

This method of making a plurality of dart chains does not include a cutting step, much less two cutting steps, a disadvantage that may be required where dart chains are produced by cutting a base chain, where two chain links may be wasted since there are two ends to every dart chain.

In operation, a method of making the oil tank valve dart apparatus 10 may include the following steps:

a) making a first dart chain as indicated above;

b) placing the widened distal half link (such as distal half link 58 of FIG. 2B) of the first dart chain over the top 26 and about the shaft 24 of a dart 12;

c) pinching the widened distal half link of the first dart chain closed such that the distal half link is retained on the shaft 24 and cap 26; and then d) opening the safety pin 16 and inserting one of the elongate portions 38, 40 into the proximal half link of the first dart chain.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. An oil tank valve dart apparatus for being inserted through two portions of an oil tank valve that move relative to each other to permit oil flow and for holding a seal, comprising:

a) a body for being inserted through the two portions of the oil tank valve to prevent the two portions of the oil tank valve from moving relative to each other to thereby prevent fluid flow, the body having a first width, the body having a proximal end and a distal end;

b) a stop on the body, the stop being on the proximal end of the body, the stop having a second width, the second width of the stop being greater than the first width of the body such that the stop stops an insertion of the body into the oil tank valve at a predefined location;

c) a through opening in the body between the proximal and distal ends of the body for receiving the seal;

d) a cap, the cap engaged to and spaced from the stop, the cap and body being disposed on opposite sides of the stop;

e) the body, stop and cap being integral and one-piece; and f) a tether and safety pin, the tether having a proximal end and a distal end, the proximal end of the tether being engaged between the cap and stop, the distal end of the tether being engaged to the safety pin.

2. The oil tank valve dart apparatus of claim 1, wherein the cap includes a third width, the third width of the cap being less than the second width of the stop.

3. The oil tank valve dart apparatus of claim 1, wherein the cap includes a third width, the third width of the cap being less than the first width of the body.

4. The oil tank valve dart apparatus of claim 1, and further comprising a shaft between the cap and the stop, the shaft, cap, stop and base being integral and one-piece.

5. The oil tank valve dart apparatus of claim 1, in combination with the seal, the seal comprising a strip having a loop form and a strip form, the strip having a width, said through opening having a length extending in a longitudinal direction, the length of the through opening being less than twice the width of the strip to minimize longitudinal movement of the strip in the through opening while in said loop form and to maintain ease of insertion of the strip through said through opening when the strip is in said strip form.

6. The oil tank valve dart apparatus of claim 1, in combination with the seal, the seal having one of a width and length at least as great as said stop such that the seal prevents the body from sliding a first way out of the oil valve and such that the stop prevents the body from sliding a second way out of the oil valve, the seal having a structural integrity, the seal being nonslideable out of said through opening when the structural integrity of the seal is intact.

7. The oil tank valve dart apparatus of claim 1, in combination with the seal, the seal having one of a width and length at least as great as said stop such that the seal prevents the body from sliding a first way out of the oil tank valve and such that the stop prevents the body from sliding a second way out of the oil tank valve, the seal comprising a loop form, the seal being slideable out of said through opening when the loop form is transformed into a strip form.

8. The oil tank valve dart apparatus of claim 4, the tether being engaged to the shaft.

9. The oil tank valve dart apparatus of claim 1, wherein the cap, stop and body are coaxial with each other.

10. An oil tank valve dart apparatus for being inserted through two portions of an oil tank valve that move relative to each other to permit oil flow and for holding a seal, comprising:
  a) a body for being inserted through the two portions of the oil tank valve to prevent the two portions of the oil tank valve from moving relative to each other to thereby prevent fluid flow, the body having a first width, the body having a proximal end and a distal end;
  b) a stop on the body, the stop being on the proximal end of the body, the stop having a second width, the second width of the stop being greater than the first width of the body such that the stop stops an insertion of the body into the oil valve at a predefined location;
  c) a through opening in the body between the proximal and distal ends of the body for receiving the seal;
  d) a cap, the cap engaged to and spaced from the stop, the cap and body being disposed on opposite sides of the stop;
  e) the cap having a third width, the third width of the cap being less than the first width of the stop;
  f) a shaft between the cap and the stop;
  g) the body, stop, cap and shaft being integral and one-piece; and
  h) a tether and safety pin, the tether having a proximal end and a distal end, the proximal end of the tether being engaged between the cap and stop, the distal end of the tether being engaged to the safety pin.

11. The oil valve dart apparatus of claim 10, the tether being engaged to the shaft.

12. The oil valve dart apparatus of claim 10, wherein the third width of the cap is less than the first width of the body.

13. A method for attaching a tether having tether openings to an oil tank valve dart apparatus, the oil valve dart apparatus being insertable through two portions of an oil tank valve that move relative to each other to permit oil flow and for holding a seal, the oil tank valve dart apparatus comprising a) a body for being inserted through the two portions of the oil valve to prevent the two portions of the oil valve from moving relative to each other to thereby prevent fluid flow, the body having a first width, the body having a proximal end and a distal end, b) a stop on the body, the stop being on the proximal end of the body, the stop having a second width, the second width of the stop being greater than the first width of the body such that the stop stops an insertion of the body into the oil tank valve at a predefined location, c) a through opening in the body between the proximal and distal ends of the body for receiving the seal, d) a cap, the cap engaged to and spaced from the stop, the cap and body being disposed on opposite sides of the stop, e) a shaft between the cap and stop and engaged to each of the cap and stop, and f) the body, stop, cap and shaft being integral and one-piece, the method comprising the steps of:
  a) selecting a tether opening in the tether;
  b) placing the tether opening over the cap and about the shaft; and
  c) narrowing said tether opening to a width less than a width of an underside of the cap.

14. The method of claim 13, and further comprising the step of widening the tether opening in the tether, the step of widening the tether opening taking place between the steps of selecting a tether opening and placing the tether opening over the cap.

15. The method of claim 13, and further comprising the step of selecting a chain as the tether, the chain comprising a set of links, one of the links of the chain comprising said tether opening.

16. An oil tank valve dart apparatus for being inserted through two portions of an oil tank valve that move relative to each other to permit oil flow and for holding a seal, comprising:
  a) a body for being inserted through the two portions of the oil tank valve to prevent the two portions of the oil tank valve from moving relative to each other to thereby prevent fluid flow, the body having a first width, the body having a proximal end and a distal end;
  b) a stop on the body, the stop being on the proximal end of the body, the stop having a second width, the second width of the stop being greater than the first width of the body such that the stop stops an insertion of the body into the oil tank valve at a predefined location;
  c) a through opening in the body between the proximal and distal ends of the body for receiving the seal;
  d) a cap, the cap engaged to and spaced from the stop, the cap and body being disposed on opposite sides of the stop;
  e) the body, stop and cap being integral and one-piece; and
  f) the seal, the seal comprising a strip having a loop form and a strip form, the strip having a width, said through opening having a length extending in a longitudinal direction, the length of the through opening being less than twice the width of the strip to minimize longitudinal movement of the strip in the through opening while in said loop form and to maintain ease of insertion of the strip through said through opening when the strip is in said strip form.

17. An oil tank valve dart apparatus for being inserted through two portions of an oil tank valve that move relative to each other to permit oil flow and for holding a seal, comprising:
  a) a body for being inserted through the two portions of the oil tank valve to prevent the two portions of the oil tank valve from moving relative to each other to thereby prevent fluid flow, the body having a first width, the body having a proximal end and a distal end;
  b) a stop on the body, the stop being on the proximal end of the body, the stop having a second width, the second width of the stop being greater than the first width of the body such that the stop stops an insertion of the body into the oil tank valve at a predefined location;

c) a through opening in the body between the proximal and distal ends of the body for receiving the seal;

d) a cap, the cap engaged to and spaced from the stop, the cap and body being disposed on opposite sides of the stop;

e) the body, stop and cap being integral and one-piece; and f) the seal, the seal having one of a width and length at least as great as said stop such that the seal prevents the body from sliding a first way out of the oil tank valve and such that the stop prevents the body from sliding a second way out of the oil tank valve, the seal comprising a loop form, the seal being slideable out of said through opening when the loop form is transformed into a strip form.

18. An oil tank valve dart apparatus for being inserted through two portions of an oil tank valve that move relative to each other to permit oil flow and for holding a seal, comprising:

a) a body for being inserted through the two portions of the oil tank valve to prevent the two portions of the oil tank valve from moving relative to each other to thereby prevent fluid flow, the body having a first width, the body having a proximal end and a distal end;

b) a stop on the body, the stop being on the proximal end of the body, the stop having a second width, the second width of the stop being greater than the first width of the body such that the stop stops an insertion of the body into the oil tank valve at a predefined location;

c) a through opening in the body between the proximal and distal ends of the body for receiving the seal;

d) a cap, the cap engaged to and spaced from the stop, the cap and body being disposed on opposite sides of the stop; and e) a tether and safety pin, the tether having a proximal end and a distal end, the proximal end of the tether being engaged between the cap and stop, the distal end of the tether being engaged to the safety pin.

19. An oil tank valve dart apparatus for being inserted through two portions of an oil tank valve that move relative to each other to permit oil flow and for holding a seal, comprising:

a) a body for being inserted through the two portions of the oil tank valve to prevent the two portions of the oil tank valve from moving relative to each other to thereby prevent fluid flow, the body having a first width, the body having a proximal end and a distal end;

b) a stop on the body, the stop being on the proximal end of the body, the stop having a second width, the second width of the stop being greater than the first width of the body such that the stop stops an insertion of the body into the oil valve at a predefined location;

c) a through opening in the body between the proximal and distal ends of the body for receiving the seal;

d) a cap, the cap engaged to and spaced from the stop, the cap and body being disposed on opposite sides of the stop;

e) the cap having a third width, the third width of the cap being less than the first width of the stop;

f) a shaft between the cap and the stop; and g) a tether and safety pin, the tether having a proximal end and a distal end, the proximal end of the tether being engaged between the cap and stop, the distal end of the tether being engaged to the safety pin.

20. A method for attaching a tether having tether openings to an oil tank valve dart apparatus, the oil valve dart apparatus being insertable through two portions of an oil tank valve that move relative to each other to permit oil flow and for holding a seal, the oil tank valve dart apparatus comprising a) a body for being inserted through the two portions of the oil valve to prevent the two portions of the oil valve from moving relative to each other to thereby prevent fluid flow, the body having a first width, the body having a proximal end and a distal end, b) a stop on the body, the stop being on the proximal end of the body, the stop having a second width, the second width of the stop being greater than the first width of the body such that the stop stops an insertion of the body into the oil tank valve at a predefined location, c) a through opening in the body between the proximal and distal ends of the body for receiving the seal, d) a cap, the cap engaged to and spaced from the stop, the cap and body being disposed on opposite sides of the stop, and e) a shaft between the cap and stop and engaged to each of the cap and stop, the method comprising the steps of:

a) selecting a tether opening in the tether;

b) placing the tether opening over the cap and about the shaft; and c) narrowing said tether opening to a width less than a width of an underside of the cap.

21. An oil tank valve dart apparatus for being inserted through two portions of an oil tank valve that move relative to each other to permit oil flow and for holding a seal, comprising:

a) a body for being inserted through the two portions of the oil tank valve to prevent the two portions of the oil tank valve from moving relative to each other to thereby prevent fluid flow, the body having a first width, the body having a proximal end and a distal end;

b) a stop on the body, the stop being on the proximal end of the body, the stop having a second width, the second width of the stop being greater than the first width of the body such that the stop stops an insertion of the body into the oil tank valve at a predefined location;

c) a through opening in the body between the proximal and distal ends of the body for receiving the seal;

d) a cap, the cap engaged to and spaced from the stop, the cap and body being disposed on opposite sides of the stop; and e) the seal, the seal comprising a strip having a loop form and a strip form, the strip having a width, said through opening having a length extending in a longitudinal direction, the length of the through opening being less than twice the width of the strip to minimize longitudinal movement of the strip in the through opening while in said loop form and to maintain ease of insertion of the strip through said through opening when the strip is in said strip form.

22. An oil tank valve dart apparatus for being inserted through two portions of an oil tank valve that move relative to each other to permit oil flow and for holding a seal, comprising:

a) a body for being inserted through the two portions of the oil tank valve to prevent the two portions of the oil tank valve from moving relative to each other to thereby prevent fluid flow, the body having a first width, the body having a proximal end and a distal end;

b) a stop on the body, the stop being on the proximal end of the body, the stop having a second width, the second width of the stop being greater than the first width of the body such that the stop stops an insertion of the body into the oil tank valve at a predefined location;

c) a through opening in the body between the proximal and distal ends of the body for receiving the seal;

d) a cap, the cap engaged to and spaced from the stop, the cap and body being disposed on opposite sides of the stop; and e) the seal, the seal having one of a width and length at least as great as said stop such that the seal prevents the body from sliding a first way out of the oil tank valve and such that the stop prevents the body from sliding a second way out of the oil tank valve, the seal comprising a loop form, the seal being slideable out of said through opening when the loop form is transformed into a strip form.

\* \* \* \* \*